United States Patent [19]

Martin et al.

[11] Patent Number: 4,893,679

[45] Date of Patent: Jan. 16, 1990

[54] HEAT-RESPONSIVE ELEMENT FOR FIRE PROTECTION SPRINKLERS OR THE LIKE

[75] Inventors: James M. Martin, East Greenwich; Leo W. Fleury, Jr., North Smithfield; Michael A. Fischer, West Kingston, all of R.I.

[73] Assignee: Grinnell Corporation, Exeter, N.H.

[21] Appl. No.: 162,479

[22] Filed: Mar. 1, 1988

[51] Int. Cl.[4] .............................................. A62C 37/12
[52] U.S. Cl. ........................................ 169/39; 169/42; 169/40
[58] Field of Search ......................... 169/38, 39, 42, 40, 169/37, 41, 90; 403/2, 32

[56] References Cited

U.S. PATENT DOCUMENTS

| | | | |
|---|---|---|---|
| 3,880,234 | 4/1975 | Showalter | 166/251 |
| 3,884,307 | 5/1975 | Williams | 169/59 |
| 3,897,828 | 8/1975 | Glover | 169/43 |
| 4,055,829 | 10/1977 | Ruegsegger | 169/42 X |
| 4,121,533 | 10/1978 | Pappas | 222/39 X |
| 4,147,938 | 4/1979 | Heckman | 250/506.1 |
| 4,170,189 | 10/1979 | Pappas | 169/42 X |
| 4,176,719 | 12/1979 | Bray | 169/39 |
| 4,257,485 | 3/1981 | Coccia | 169/61 |
| 4,273,195 | 6/1981 | Fischer | 169/39 |
| 4,282,931 | 8/1981 | Golben | 169/61 |
| 4,292,358 | 9/1981 | Fryer | 428/135 |
| 4,298,068 | 11/1981 | Bray | 169/39 |
| 4,343,364 | 8/1982 | Glinecke | 169/42 X |
| 4,580,729 | 4/1986 | Pounder | 169/37 |
| 4,757,865 | 7/1988 | Simons | 169/42 X |

OTHER PUBLICATIONS

DeHaven, P. W., "The Reaction Kinetics of Liquid 60/40 Sn/Pb Solder with Copper and Nickel: A High Temperature X-Ray Diffraction Study," *Materials Research Society Symposium Proceedings*, vol. 40, 1985, pp. 123–128.
Pepi, Jerome S., "Concept and Development of the Residential and Fast Response Sprinklers", *New Technology Update*, vol. No. 52, pp. 22–29, Spring 1985.
Materials Engineering, pp. 100–107, Dec. 1986.
"Standard Specification for NICKEL", ASTM Committee B-2 on Nonferrous Metals and Alloys, pp. 59–61, Feb. 28, 1975.
Moore, R. H., "Correlation of Diffusion Data as a Periodic Function of Atomic", pp. 275–280 (1965).
Hansen, M. Dr. phil, habil. "Der Aufbau der Zweistofflegierungen", Berlin, 1936 pp. 294–295, 414–415.
Diagrams, pp. 39, 21, 13, 19.
Askill, John, "Tracer Diffusion Data for Metals, Alloys, and Simple Oxides", London, 1970, pp. 1–77.
Staudhammer, K. P. and Murr, L. E., "Atlas of Binary Alloys", 1973, pp. xi–xiv, 3, 4, 5, 6, 7, 12, 36, 54, 55, 56, 86, 87.
Diffusion and Defect Data, Metals & Alloys, 1979, p. 62 (Trans Tech Pub.).
Allen et al., Mat. Res. Symp. Proc., 40:139–44 (1985).
Dunn et al., Mat. Res. Symp. Proc., 40: 129–38 (1985).
Frear et al., Mat. Res. Symp. Proc., 72: 181–86 (1986).
Chang, Mat. Res. Symp. Proc., 72: 267–75 (1986).
Yoshiya et al., "Solderability of Thick Film Substrate," (1977).

*Primary Examiner*—Joseph F. Peters, Jr.
*Assistant Examiner*—James M. Kannofsky
*Attorney, Agent, or Firm*—Fish & Richardson

[57] ABSTRACT

A heat-responsive element has two links joined with a thin solder layer in a face-to-face relationship over an extended surface area. The components of opposed surfaces of the links in contact with the solder layer and the solder layer are adapted to alloy with each other in the regions immediately adjacent each opposed surface to form alloy bonds between the opposed surfaces and the solder layer. The strength of these bonds is greater than the strength of the solder layer. At least the opposed surfaces of the links consist, at least in part, of an alloy-forming amount of nickel, cobalt, chromium or iron, or an alloy of nickel, cobalt, chromium, or iron.

12 Claims, 1 Drawing Sheet

U.S. Patent  Jan. 16, 1990  4,893,679
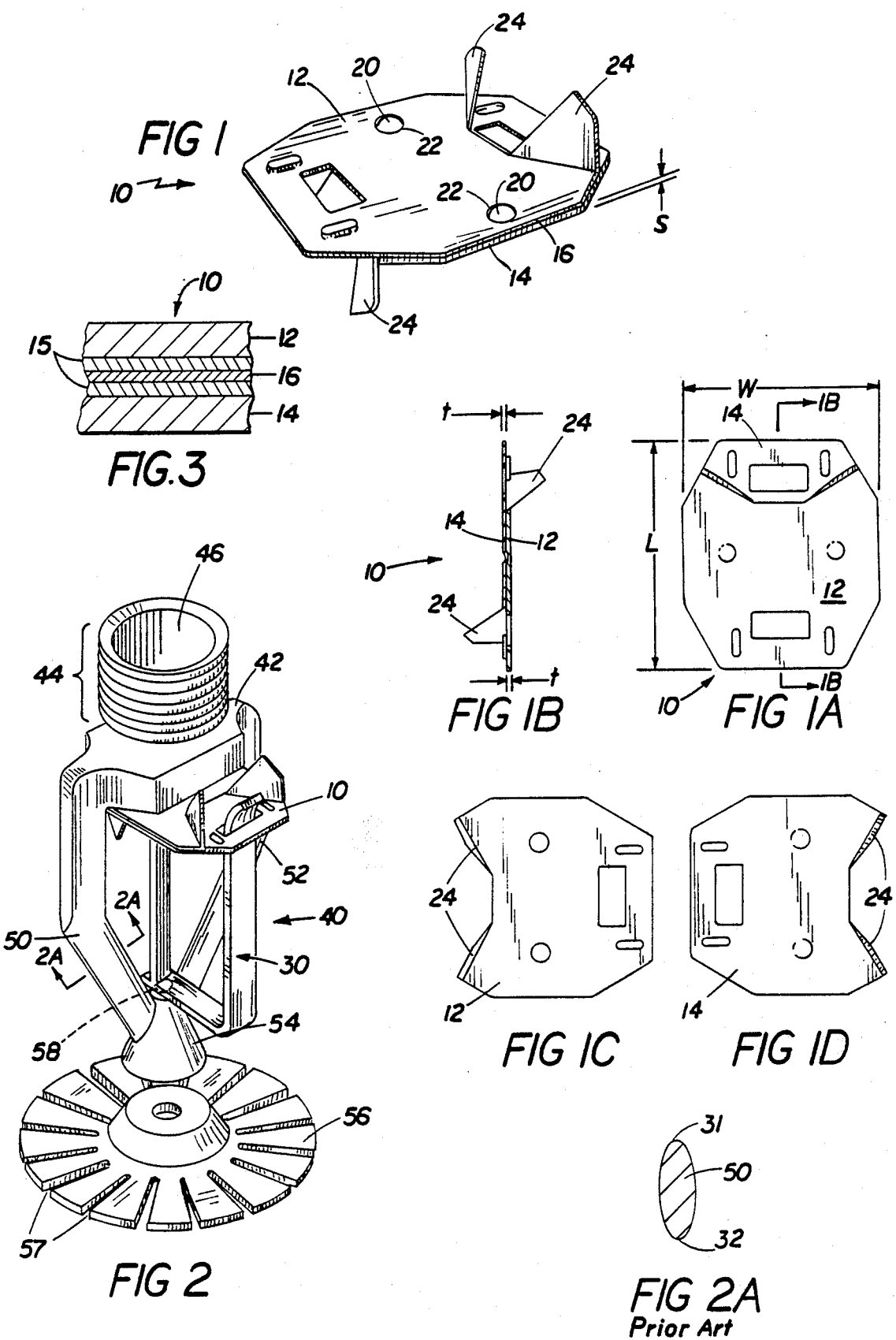

HEAT-RESPONSIVE ELEMENT FOR FIRE PROTECTION SPRINKLERS OR THE LIKE

BACKGROUND OF THE INVENTION

This invention relates to heat-responsive elements.

Heat-responsive elements formed from two pieces of metal attached with a layer of fusible solder have been used in fire protection devices, alarm devices, and the like to permit these devices to be operated automatically at some predetermined critical temperature. When this temperature is reached, the solder joint ruptures, thereby activating the device, e.g., to release fire suppressant material, or to sound an alarm. Pappas et al., U.S. No. 4,170,189 describes a heat-responsive element specifically for use with an alarm. Two thin link plates, at least one made of a material, e.g., stainless steel, which does not alloy significantly with solder, are joined face-to-face with a thin solder layer. The bond between the link plate and solder is weaker than the solder layer itself, and the metal/solder bond ruptures as the critical temperature is neared.

SUMMARY OF THE INVENTION

In general, the invention features a heat-responsive element that includes two link members joined with a thin fusible solder layer in a face-to-face relationship over an extended surface area. The components of the opposed surfaces of the link members in contact with the solder layer and the solder layer are adapted to alloy with each other in the regions immediately adjacent each of the opposed surfaces to form alloy bonds between these surfaces and the solder layer whose strength is greater than the strength of the solder layer. In this way, when the fuse temperature of the element (i.e., the temperature at which the solder melts, thereby disengaging the link members) is reached, the solder joint is broken through the solder layer, rather than at the metal/solder interface. At least, the opposed surfaces of the link members include an alloy-forming amount of nickel, cobalt, chromium, iron, or an alloy of one or more thereof, with nickel and its alloys being the most preferred.

In other preferred embodiments, when the surfaces of the link are nickel, the solder layer preferably includes tin, cadmium, indium, or a combination thereof, and the alloy bonds include a nickel-tin alloy, nickel-indium alloy, nickel-cadmium alloy, or a combination thereof. The solder layer may also include an alloy-forming amount of nickel, chromium, cobalt, iron, or an alloy thereof.

In still other preferred embodiments, the fuse temperature of the element does not vary from a pre-determined value (based on the composition of the solder layer) by more than 3.5% over the lifetime of the element (as measured by Factory Mutual Research Corp. Approval Standard for Early Suppression, Fast Response, Automatic Sprinklers, page 26, paragraph 5.11 (June 18, 1986), described in more detail below. Furthermore, the Response Time Index of the element preferably is less than 65 $s^{\frac{1}{2}} ft^{\frac{1}{2}}$ (e.g., between 40 and 65 $s^{1/2} ft^{\frac{1}{2}}$) as measured by Factory Mutual Research Corp. Approval Standard for Early Suppression, Fast Response, Automatic Sprinklers, pages 39-41, paragraph 5.24 (June 18, 1986), described in more detail below.

The invention also features a method of preparing such heat-responsive elements.

According to another aspect of the invention, the heat-responsive element is used in combination with a fire protection sprinkler head of the type including a base having a throat of predetermined cross-section through which a stream of fire retardant fluid can flow.

The invention provides a heat-responsive element useful in a variety of applications e.g., fire sprinklers, fire alarms and heat detectors. The fuse temperature of the element remains essentially constant over the lifetime of the device due to limited diffusion to and from the link members and the ability to restrict the alloy bonds to the area immediately adjacent the opposed surfaces (rather than allowing alloying to extend through the solder layer thickness as a result of diffusion occurring over time). Thus, the element performs reproducibly and reliably over time. Furthermore, by forming alloying bonds between the link members and solder layer that are stronger than the solder layer, failure is limited by the load-carrying ability of the solder-layer, thereby minimizing the chances that the actual operating temperature at which the element is activated will be different from the pre-determined fuse temperature. Moreover, the use of a thin solder layer (e.g., approximately 0.001 inch or less, where this figure includes the thickness of both the unalloyed solder and the alloyed interfacial metal/solder regions) results in faster response time and reduced creep effects.

Other features and advantages of the invention will be apparent from the following description of a presently preferred embodiment, and from the claims.

PREFERRED EMBODIMENT

We first briefly describe the drawings.

FIG. 1 is a perspective view of a heat responsive element of the invention, while FIG. 1A is a plan view of the element of FIG. 1 and FIG. 1B is a side section view taken at the line 1B—1B of FIG. 1A, and FIGS. 1C and 1D are plan views of the link members of the element of FIG. 1; and FIG. 2 is a perspective view of a fire protection sprinkler including a heat-responsive element of the invention, while FIG. 2A is a section view along the line 2A—2A of FIG. 2.

FIG. 3 is a diagrammatic sectional view of an alternative embodiment of a heat responsive element according to the invention.

Referring to FIG. 1, a heat-responsive element 10 of the invention, as described above, features two thin link members 12 (FIG. 1C), 14 (FIG. 1D), e.g., of metal or having a metal surface, having a length, L, approximately ⅞ inch, and width, W, approximately ¾ inch, each with a thickness, t, about 0.006 inch, separated by a thin layer of solder 16, of thickness, S, approximately 0.001 inch. Link member 14 defines a pair of alignment dimples 20 that are received in corresponding apertures 22 of link member 12. The ends of each link are deformed into fins 24 for affecting air flow about the link. Thin link plates having a large surface-area-to-thickness ratio are desirable because they conduct heat to the solder faster, thereby decreasing the time it takes for the element to reach its fuse temperature to cause operation of the device into which the element is incorporated. A portion of the solder layer is alloyed with the surfaces of the two plates to form an interfacial alloyed region that bonds the solder layer on both sides to the plates.

Preferred materials for the entire plate or just the surface are nickel, cobalt, chromium, and iron (or alloys having a high, e.g., greater than 40%, content of one of these elements) for the reasons given below. Surface coatings are preferably formed by sputtering. The solder may also contain one or more of these elements.

Materials that alloy with each other to form an alloy that is stable over the temperature range to which the element will be subjected in actual use are selected by referring to temperature-composition phase diagrams. Such phase diagrams may be found in references such as Staudhammer and Murr, *Atlas of Binary Alloys, A Periodic Index*, Marcel Dekker, Inc. (1973) and Hansen, *Constitution of Binary Alloys*, McGraw-Hill (1958). The most stable alloys will be those having the most negative Gibbs free energy of formation. For example, where the link plate is nickel and the solder is a tin-lead eutectic, a stable alloy will form between the nickel and tin but not nickel and lead. Nickel also forms suitable alloys with cadmium and indium. Cobalt plates may be used with solders containing indium or tin, while chromium may be used with indium-containing solders.

It is also desired that the intermetallic boundary layer alloy be stronger than the unalloyed portion of the solder layer so that when the fuse temperature is reached, the element fails within the solder layer, rather than at the metal/solder interface. The problem with elements that fail at the interface is that the actual temperature at which the alloy bond in the interfacial region fails may be different from the intended predetermined fuse temperature. By restricting failure to the solder layer by making it weaker than the alloy bond, the actual operating temperature is the same as the predetermined fuse temperature because this latter temperature is dependent upon the properties of the solder.

In order for the heat-responsive element to perform reliably in actual operation, it is important that the predetermined fuse temperature remain constant over the lifetime of the element. In many heat-responsive elements, the fuse temperature changes over time because of atomic diffusion between the solder and link plates. Diffusion changes the composition of the solder, which in turn changes the fuse temperature of the element. Because diffusion is a thermally activated process, the rate of diffusion (and thus the change in fuse temperature) increases significantly at elevated temperatures.

There are basically two types of diffusion occurring in a typical heat-responsive element: self-diffusion and inter-diffusion. Self-diffusion involves the thermally activated motion of atoms within a volume of the same type of atoms. The activation energy required for self-diffusion is equivalent to the energy necessary to form a vacancy into which an atom can migrate. Thus, the rate of diffusion is dependent on the concentration of vacancies at any given temperature.

The concentration of vacancies at any given temperature is dependent on the melting point of a particular material. Increasing the melting point results in the formation of fewer vacancies at any given temperature and thus a lower rate of self-diffusion. Therefore, it is desirable to choose materials for the link plates that have relatively high melting points (such materials may also be incorporated into the solder). Nickel (melting point=1455° C.), cobalt (melting point=1495° C.), chromium (melting point=1890° C., and iron (melting point=1535° C.) (and alloys having a high percentage, e.g., at least 40%, of these elements) are particularly useful materials. For example, at any given temperature there are fewer vacancies in nickel than there are in copper (melting point=1083° C.). The activation energy for self-diffusion for nickel, accordingly, is on the order of 1.5 times that of copper.

The second type of diffusion is inter-diffusion, which involves the migration of one atomic species in one direction and a second atomic species in the opposite direction, each down a concentration or activity gradient. Although the activation energy for inter-diffusion differs from that of self-diffusion, the rate of inter-diffusion is also influenced by the rate of vacancy formation. The more vacancies there are in a material, the more places there are into which a second atomic species can migrate. Therefore, the use of relatively high melting point materials also minimizes the rate of inter-diffusion (and therefore the rate of change in fuse temperature).

Diffusion can also be influenced by mechanisms such as electric fields and local states of stress. Residual stresses can be caused by the forming operations used to fabricate the link plates. As temperature increases and recrystallization occurs, the boundaries separating stressed and unstressed areas move; the net effect is a change in the vacancy concentration and rate of diffusion. Such effects are also minimized by using high-melting point elements such as nickel because these elements also have relatively high recrystallization temperatures. For example, the recrystallization temperature of nickel is about 399° C., whereas the value for copper is only about 121° C.

To minimize diffusion even further, the link plates can be provided with a diffusion barrier 15 (FIG. 3), e.g., a material that is solderable with proper fluxing.

The heat responsive element of the invention may be used in conjunction with a typical sprinkler head, e.g., by way of example only, a pendant sprinkler head 40 (FIG. 2), as described in Pounder U.S. Pat. No. 4,580,729, the disclosure of which is incorporated herein by reference. The sprinkler 40 has a base 42 threaded at 44 for connection to the outlet of a fire retardant fluid piping system. The base has a circular inlet and passage 46 which terminates in a circular discharge throat of predetermined cross-section. Extending from the base at opposite sides of the throat are frame arms 50, 52 that join to generally conical central boss 54 to form an arch. The boss is supported by the arms in axial alignment with the throat. Affixed to the base of the boss is a deflector 56 designed with slots 57 for achieving a high percentage of relatively large fluid drops. At the apex of boss 54 is loading pin 58, provided to receive the lower end of a heat-responsive assembly 30 bearing the heat-responsive element 10 of the invention. Assembly 30, in standby condition, rigidly retains a valve element that blocks flow of fluid from the throat. Referring to FIG. 2A, in cross-section each of the frame arms has a streamline shape, with a narrow leading edge 31 and a smooth, gradual transition to the region of maximum width and a smooth, gradual transition to the narrow trailing edge 32.

In operation, when heat has caused the heat-responsive element 10 to actuate and release the valve element from sprinkler throat, fire retardant fluid flows.

The fuse temperature of actuation preferably does not vary by more than 3.5% over the lifetime of the device, as measured by the Accelerated Time Test described in Paragraph 5.11 of the Factory Mutual Approval Standard noted in the Summary of the Invention, above. According to this test, at least 10 sprinklers incorporating the heat element are subjected to the high test temperature selected according to Table 1, below, for a period of 90 days.

TABLE 1

| Sprinkler Nominal Fuse Temperature Rating | Nominal Test Temperature |
|---|---|
| 68–74° C. | 52° C. |
| 93–104° C. | 79° C. |

An automatically controlled, circulating constant-temperature oven is used for the test. At the end of the 90 day period, the fuse temperature of each sprinkler is measured according to Factory Mutual Research Corp. Approval Standard, page 24, paragraph 5.7 (June 18, 1986) as follows.

At least 10 sprinklers incorporating the heat-responsive element are immersed in a vessel containing water or vegetable oil (when fuse temperatures greater than the boiling point of water are anticipated). The vessel is equipped with a source for heating the liquid and means for agitating the liquid. The temperature of the bath is measured with a thermometer calibrated in accordance with ASTM standard E-1-80. The liquid temperature is raised until it is within 20° F. (11.1° C.) of the nominal fuse temperature of the sprinkler. The temperature rise is then controlled at a rate not exceeding 1° F. (0.56° C.) per minute until operation of the sprinkler occurs or a temperature 10 percent above the rated temperature is reached. The temperature of the liquid at the time of operation of each sprinkler is recorded as the fuse temperature.

When subjected to the accelerated testing described above, the fuse temperatures of sprinklers incorporating a heat element prepared from nickel-containing base plates varied by no more than 3.5% from their original fuse temperature ratings.

The Response Time Index (RTI) is a measure of the ability of an element to respond when the fuse temperature is reached by rupturing the solder joint. It is measured according to the plunge test described in Paragraph 5.24 of the Factory Mutual Approval Standard noted in the Summary of the Invention, above. According to this test, at least 12 sprinklers incorporating the heat-responsive element at each nominal fuse temperature rating are plunged into the test section of a tunnel equipped with a mercury plunge switch to start the test and a pressure switch to stop the test. The air flow and temperature conditions in the test section of the tunnel are established as follows.

| Nominal Fuse Temperature Rating of Sprinkler (°C.) | Tunnel Temperature (°C.) | Air Velocity (m/s) |
|---|---|---|
| 68–74 | 197 | 2.56 |
| 93–104 | 197 | 2.56 |

Prior to plunging into the test section of the tunnel, each sprinkler is mounted on a tunnel test section cover and maintained in a conditioning chamber to allow the sprinkler and cover to reach approximately room temperature for a period of not less than 30 minutes. In the case of a sprinkler with symmetrical frame and operating parts, six tests are conducted with the frame arms in a plane perpendicular to the flow of heated air. Where the sprinkler has an asymmetrical thermo-sensitive assembly, the tests are conducted to evaluate the effect of sprinkler position relative to the flow of air (e.g., for a link and lever type sprinkler, six tests are conducted with the link assembly facing upstream and six tests with its facing downstream).

From the response times obtained from the above-described plunge test, the RTI is calculated according to the following equation:

$$RTI = \tau(U)^{\frac{1}{2}}$$

where U is the air velocity in the test section of the tunnel (from the above table); and $$\tau = -t_r/\ln(1 - \Delta T_{La}/\Delta T_g)$$

where t is the measured response time of the sprinkler;
$\Delta T_{La}$ is the mean fuse temperature of the sprinkler calculated as the difference between the fuse temperature measured according to the test in paragraph 5.7 (described above) and the ambient temperature; and
$\Delta T_g$ is the plunge test tunnel temperature (from the table) minus the ambient temperature.

When subjected to the above-described plunge test, RTI values of sprinklers incorporating a heat element prepared from nickel-containing base plates were less than 65 $s^{\frac{1}{2}}$ $ft^{\frac{1}{2}}$.

The heat-responsive elements are prepared using conventional soldering techniques, temperatures, and times, such as those described in H. Manko, *Solders and Soldering* (2nd ed.-1979).

Other embodiments are within the following claims.

We claim:

1. A heat-responsive element comprising two link members joined with a thin solder layer in a face-to-face relationship over an extended surface area,
   the components of opposed surfaces of said link members in contact with said solder layer and said solder layer being adapted to alloy with each other in the regions immediately adjacent each of said opposed surfaces to form alloy bonds between said opposed surfaces and said solder layer, the strength of said alloy bonds being greater than the strength of said solder layer, and at least said opposed surfaces of said link members comprise an alloy-forming amount of a member selected from the group consisting of nickel, cobalt, chromium and iron, or of an alloy of a member selected from the group consisting of nickel, cobalt, chromium, and iron.

2. The heat-responsive element of claim 1 wherein said opposed surfaces of said link members comprise nickel.

3. The heat-responsive element of claim 2 wherein said solder layer comprises a member selected from the group consisting of tin, cadmium, indium, and a combination thereof, and said alloy bonds comprise a member selected from the group consisting of a nickel-tin alloy, a nickel-cadmium alloy, a nickel-indium alloy, and a combination thereof.

4. The heat-responsive element of claim 1 wherein the fuse temperature of said element does not vary from a pre-determined value by more than 3.5% over the lifetime of the device, as measured by the Accelerated Time Test.

5. The heat-responsive element of claim 1 or 4 wherein the Response Time Index of said element is less than 65 $s^{178}$ $ft^{\frac{1}{2}}$.

6. The heat-responsive element of claim 1 or 4 wherein the Response Time Index of said element is between 40 and 65 $s^{\frac{1}{2}}$ $ft^{\frac{1}{2}}$.

7. The heat-responsive element of claim 1 wherein at least one of said link members is provided with a diffusion barrier.

8. In a fire protection sprinkler head of the type including a base having a throat of predetermined cross-section through which a stream of fire retardant fluid can flow,
the improvement wherein
said fire protection sprinkler head further comprises a heat-responsive element comprising two link members joined with a thin solder layer in a face-to-face relationship over an extended surface area, the components of opposed surfaces of said link members in contact with said solder layer and said solder layer being adapted to alloy with each other in the regions immediately adjacent each of said opposed surfaces to form alloy bonds between said opposed surfaces and said solder layer, the strength of said alloy bonds being greater than the strength of said solder layer, and at least said opposed surfaces of said link members comprises an alloy-forming amount of a member selected from the group consisting of nickel, cobalt, chromium and iron, or of an alloy of a member selected from the group consisting of nickel, cobalt, chromium, and iron.

9. A process for preparing a heat-responsive element comprising joining two link members with a thin solder layer in a face-to-face relationship over an extended surface area under conditions sufficient to form alloy bonds between opposed surfaces of said link members in contact with said solder layer and said solder layer in the regions immediately adjacent said opposed surfaces, the strength of said alloy bonds being greater than the strength of said solder layer, and said opposed surfaces of said link members comprise an alloy-forming amount of a member selected from the group consisting of nickel, cobalt, chromium and iron.

10. A heat-responsive element prepared according to the process of claim 9.

11. A heat-responsive element comprising two link members joined with a thin solder layer in a face-to-face relationship over an extended surface area,
the components of opposed surfaces of said link members in contact with said solder layer and said solder layer being adapted to alloy with each other in the regions immediately adjacent each of said opposed surfaces and said solder layer, the strength of said alloy bonds being greater than the strength of said solder layer, and at least said opposed surfaces of said link members comprise an alloy-forming amount of nickel, or an alloy of nickel.

12. In a fire protection sprinkler head of the type including a base having a throat of predetermined cross-section through which a stream of five retardant fluid can flow,
the improvement wherein
said fire protection sprinkler head further comprises a heat-responsive element comprising two link members joined with a thin solder layer in a face-to-face relationship over an extended surface area, the components of opposed surfaces of said link member in contact with said solder layer and said solder layer being adapted to alloy with each other in the regions immediately adjacent each of said opposed surfaces to form alloy bonds between said opposed surfaces and said solder layer, the strength of said alloy bonds being greater than the strength of said solder layer, and at least said opposed surfaces of said link members comprise an alloy-forming amount of nickel, or an alloy of nickel.

* * * * *

UNITED STATES PATENT AND TRADEMARK OFFICE
CERTIFICATE OF CORRECTION

PATENT NO. : 4,893,679

DATED : Jan. 16, 1990

INVENTOR(S) : James M. Martin et al

It is certified that error appears in the above-identified patent and that said Letters Patent is hereby corrected as shown below:

ON TITLE PAGE:  Other Publications in the Dehaven publication, line 4, the "v" in "vol." should be capitalized; and in the Pepi publication, line 3, the "v" in "vol." should be capitalized.

Col. 1, line 53, "pre-determined" should not be hyphenated;

col. 1, line 57, delete "(";

col. 1, line 63, "$s^{178}$" should be --$s^{\frac{1}{2}}$--;

col. 2, line 22, "pre-determined" should not be hyphenated;

col. 2, line 43, delete the second occurence of the word "of"; and col. 5, line 68, "its" should be --it--.

UNITED STATES PATENT AND TRADEMARK OFFICE
CERTIFICATE OF CORRECTION

PATENT NO. : 4,893,679

DATED : January 16, 1990

INVENTOR(S) : James M. Martin et al.

It is certified that error appears in the above-identified patent and that said Letters Patent is hereby corrected as shown below:

Col. 6, line 65, "$s^{178}$" should be --$s^{\frac{1}{2}}$--;

col. 7, line 21, "comprises" should be --comprise--;

col. 8, line 19, "five" should be --fire--.

Signed and Sealed this

Nineteenth Day of November, 1991

Attest:

HARRY F. MANBECK, JR.

Attesting Officer

Commissioner of Patents and Trademarks